United States Patent [19]

Fruengel et al.

[11] Patent Number: 4,722,599
[45] Date of Patent: Feb. 2, 1988

[54] DEVICE FOR MEASURING CLOUD HEIGHT

[76] Inventors: Frank Fruengel, Kaeshaldenstrasse 5, CH-8052 Zuerich, Switzerland; Eberhard Gelbke, Klaus-Groth-Strasse 32; Horst Huettmann, Auf dem Flidd 19a, both of, D-2082 Uetersen, Fed. Rep. of Germany

[21] Appl. No.: 808,427

[22] Filed: Dec. 12, 1985

[30] Foreign Application Priority Data

Dec. 27, 1984 [DE] Fed. Rep. of Germany ....... 3447446
Oct. 15, 1985 [DE] Fed. Rep. of Germany ....... 3536659

[51] Int. Cl.$^4$ .............................................. G01C 3/08
[52] U.S. Cl. .......................................... 356/5; 342/26; 350/584; 350/588; 356/342
[58] Field of Search ................... 342/26; 356/5, 342; 350/584, 588

[56] References Cited

U.S. PATENT DOCUMENTS

| | | | |
|---|---|---|---|
| 2,442,913 | 6/1948 | Abrams et al. | 350/588 |
| 3,085,244 | 4/1963 | Kay | 342/26 |
| 3,567,915 | 3/1971 | Altshuier et al. | 342/26 |
| 4,208,125 | 6/1980 | Ling | 356/5 |
| 4,277,131 | 7/1981 | Hart et al. | 350/584 |
| 4,289,397 | 9/1981 | Itzkan et al. | 356/5 |
| 4,299,483 | 11/1981 | Brove et al. | 356/5 |
| 4,355,861 | 10/1982 | Sebald | 350/588 |
| 4,397,549 | 8/1983 | Morgan | 356/342 |
| 4,511,249 | 4/1985 | Frungel | |
| 4,605,302 | 8/1986 | Lofgren et al. | 356/5 |

FOREIGN PATENT DOCUMENTS

2726999 12/1978 Fed. Rep. of Germany .
2924490 2/1980 Fed. Rep. of Germany .
0628139 2/1982 Switzerland .

Primary Examiner—Stephen C. Buczinski
Attorney, Agent, or Firm—Michael J. Striker

[57] ABSTRACT

A ceilometer operating according to a gating method integrates output signals from a light receiver. The output signals are passed by analog gating means during consecutive time slots following each other at the transmitter frequency and being phase shifted relative to transmitted light pulses. The phase shift of the time slots is varied stepwise after preset time intervals. Signals integrated during a time interval are digitalized, processed n a microprocessor and stored in a memory according to height values determined by respective phase shifts of the time slots. The micro-processors forms a smooth function of the signals accordint to height values, differentiates the smooth function, computes maxima and minima, determines maxima differing from a preset threshold value, and selects a maximum which with increasing height value is followed by a minimum. Then the smooth function is modified by substituting the function interval corresponding to the maximum/minimum pair by a linear function interval and the modified smooth function is integrated. If the integral of the modified function exceeds a preset constant value, a precipitation warning signal is displayed. If the selected maximum sufficiently exceeds a predetermined noise level, the height corresponding to the maximum is indicated as a cloud height.

11 Claims, 10 Drawing Figures

DEVICE FOR MEASURING CLOUD HEIGHT

BACKGROUND OF THE INVENTION

The present invention relates to a ceilometer or a device for measuring height of clouds of the type which includes a transmitter for transmitting light pulses, a receiver including a photodetector for receiving light pulses reflected from clouds, gating means for passing output signals from the receiver during time gaps or time slots following each other at transmitter frequency, an integrator connected to the gating means for interpreting the passed output signals over a time interval covering a plurality of time slots having the same phase shift relative to the transmitted light pulses, and a memory for storing the integrated signal values assigned to a height value determined by the phase shift of the time slots.

Devices of this kind are known from the Swiss Patent No. 628,139 and from the German Patent No. 2,924,490. The prior art devices indicate as a cloud height or heights those height values which are associated with the largest signal values stored in the memory. They operate without problems provided that no precipitation occurs. However, when rain or snow falls, then light pulses emitted by the transmitter are reflected not only by clouds but also by rain drops or snow flakes. Signal values produced in response to the precipitation may be greater than signal corresponding to a cloud height. Accordingly, in prior art devices there is the risk that during precipitation an incorrect cloud height is indicated.

SUMMARY OF THE INVENTION

It is, therefore, a general object of the present invention to overcome the disadvantages of the prior art ceilometers.

In particular, it is an object of this invention to distinguish clouds from precipitations.

In keeping with these objects and others which will become apparent hereafter, one feature of this invention resides, in the provision of an evaluation device programmed for forming a smooth function of the integrated signal values in dependency on consecutive height values, means for differentiating the smooth function according to the height values and determining the cloud heights from maxima and minima of the differentiated smooth function.

In the preferred embodiment of this invention, the evaluation device, after determination of the maxima and minima, modifies in the smooth function by eliminating therefrom the function intervals pertaining to the range of heights between a maximum which is followed by a minimum, and substituting the eliminated interval by a linear function part, then the modified smooth function is integrated and if the integral exceeds or falls below a predetermined threshhold value, either a precipitation warning signal or a cloud height is displayed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

The ceilometer illustrated in the drawing operates on the same measuring principle as the ceilometers described in the Swiss Patent No. 628,139 and in the German Patent No. 2,924,490. Therefore, the units and their function which correspond to those known from prior art, will be only briefly explained in the following description.

Figure 1:
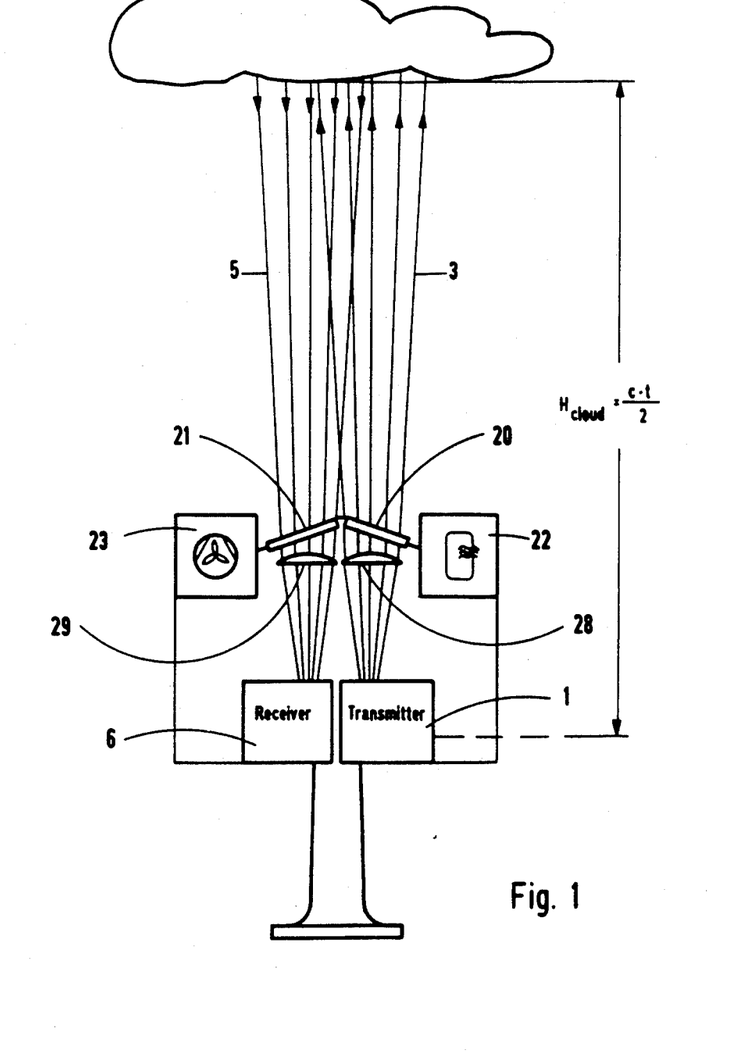
FIG. 1 is a schematic illustration of the arrangement of a ceilometer according to this invention with indicated path of light pulses between the device and a cloud.
Figure 2:
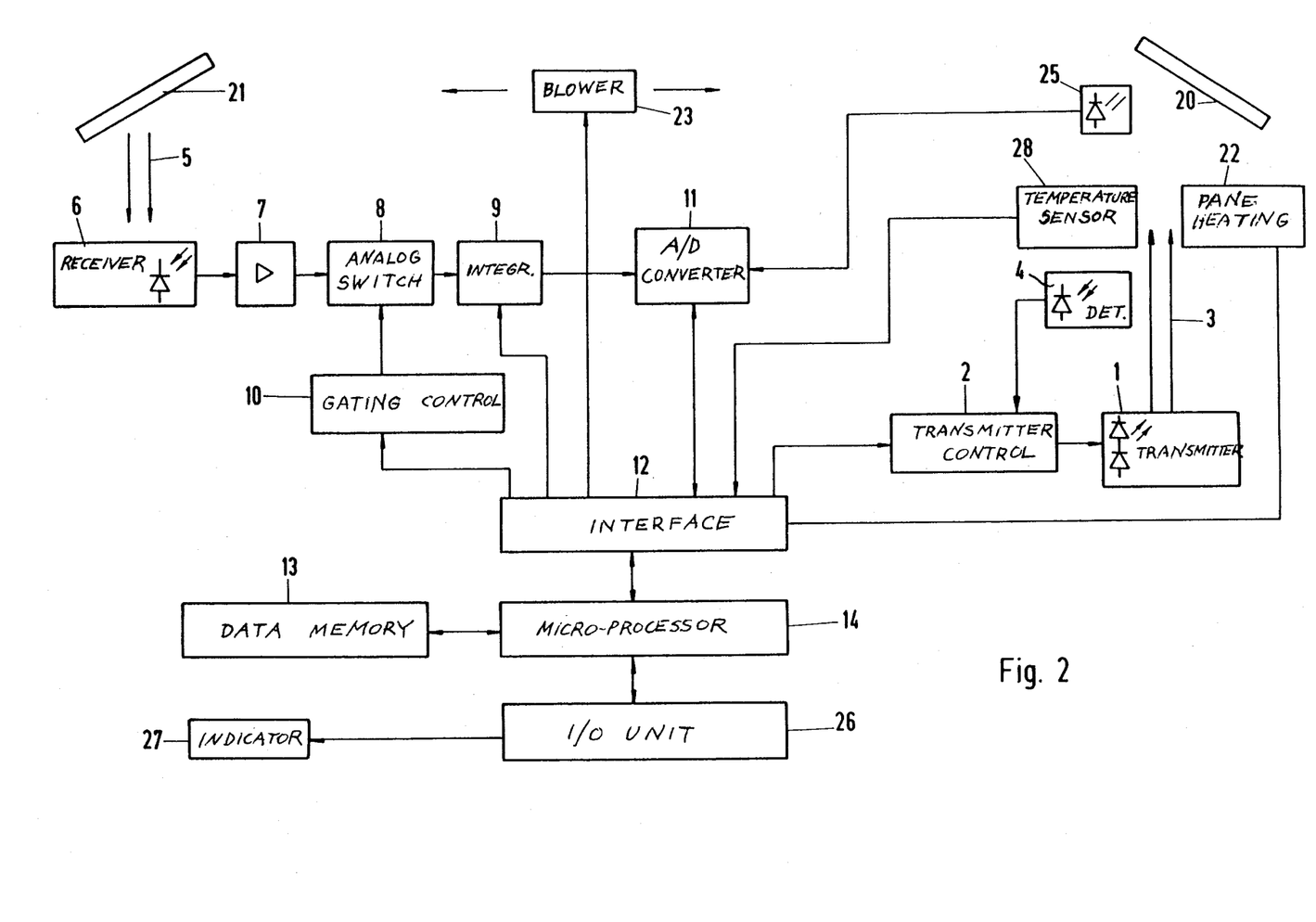
FIG. 2 is a block circuit diagram of the device of FIG. 1.

The device includes a light transmitter 1 consisting of an array of laser diodes controlled by a transmitter controlled unit 2, to periodically transmit short light pulses 3 of a high rising steepness. A non-illustrated thermostat maintains a constant operational temperature of the laser diode array. The transmitter control unit 2 monitors the light output power of the laser diode array by means of a photodetector 4 and regulates the amplitude of current pulses driving the laser diode array so as to keep the light output power constant. The light output power is adjusted such that during operation there is no risk of eye damage even if attending personnel directly looks into the transmitter optics. Light pulses 5 reflected from clouds are received in a photodetector of a receiver 6 and the resulting electric output signals are amplified in an amplifier 7 and fed through analog switch 8 to an integrator 9. The analog switch 8 together with a gating control unit 10 constitutes a gating device which passes through output signals from amplifier 7 during time gaps or time slots following each other at transmitter frequency but being phase shifted relative to the transmitted light pulses 3. Integrator 9 integrates over a predetermined time interval corresponding to a predetermined number of time slots of the same phase shift relative to the transmission time of the light pulses. The resulting integrated signal is converted by means of an analog/digital converter 11 into a digitial signal value which is applied via an interface 12 to an evaluation device consisting of a microprocessor 14 provided with a data memory 13. The microprocessor 14 stores the digital signal corresponding to the analog signal gated over an integrating time interval in the data memory 13 and resets the integrator to zero. The microprocessor 14 also controls via the interface 12 the gating device 8 and 10 in such a manner that in the subsequent integrating time interval the timing slots have a slightly larger phase shift relative to the transmission time of the light pulses 3 and the integrator 9 starts again integrating a predetermined number of the time slots during the subsequent integrating time interval. In this manner, the microprocessor 14 keeps storing a set of integrated signal values arranged according to height values H defined by the phase shift of the time slots. A height value assigned to a signal value is the product of the phase shift of the time slot associated with the signal value and of the half light speed.

Windows 20 and 21 through which light pulses 3 and 5 are transmitted and received, are provided with pane heating means 22. In addition, a blower 23 is arranged in such a manner that an air stream is blown in horizontal direction over both windows 20 and 21. The pane heating 22 is turned on when temperature sensor 28 detects a temperature below freezing point. The air blower 23 is turned on when the microprocessor 14 in the course of evaluation of measuring data detects a precipitation, as it will be explained in greater detail below. The pane heating 22 and the air blower 23 prevent rain drops or snow flakes from impairing the transmission of light pulses 3 and 5 through corresponding windows 20 and 21. Due to the fact that blower 23 is not permanently energized but is turned on under the control of the microprocessor only in the case of a precipitation, the energy consumption is substantially decreased and the service life of the blower is very long. In order to detect an impairment in the transmission of light pulses due to soiling of window panes 20 and 21, there is provided a photodetector 25 which detects light pulses reflected from the transmitter window 20. Signal detected by photodetector 25 increases with soiling of the window 20 and the microprocessor 14, when the output signal from the photodetector 25 exceeds a predetermined threshold value, delivers via input/output unit 26 a command to the display or indicating device 27 to indicate a warning sign "window needs cleaning". However, the command for displaying "window needs cleaning" is suppressed when the microprocessor 14 determines a precipitation inasmuch as in this case a signal detected by photodetector 25 can be caused by rain drops or snow flakes present on the window 20, which will be automatically removed by blower 23 or by pane heater 22.

Optical devices 28 and 29 (FIG. 1) of the transmitter and of the receiver are arranged side-by-side so that light beam 3 transmitted by transmitter 1 and light beam 5 received by receiver 6 start overlapping each other with increasing height of clouds. In a lower height measuring range the transmitted light pulses 3 reach the receiver 6 due to a multiscatter only. Consequently, the received signals in the lower height meauring range are weak and become stronger with increasing height due to increasing overlap of the two light beams 3 and 5 and hence due to the increasing direct back scatter or reflection. However, with a still increasing height they become weaker again according to the quadratic distance law. In order to neutralize these differences, it is of advantage when the number of time slots in a time interval in which integrator 9 integrates is changed by the microprocessor 14 in dependency on cloud height that means the time shift or phase shift of the time slots is changed with respect to the transmission of light pulses 3 to such an extent that the magnitude or value of integrated signal values at constant atmospheric conditions remains constant over the entire height measuring range.

As mentioned before, the microprocessor 14 constitutes an evaluation unit in the device of this invention. A program controlling the evaluating operation of the microprocessor 14 will be explained below in connection with the simplified flow chart illustrated in FIG. 3. The program is based on the following knowledge which constitutes also the base of this invention: when integrated signal values stored in data memory 13 in accordance with cloud height values are plotted in dependency on cloud height H, then for clouds measured in the case of a precipitation a function F1 (H) according to FIG. 4A, for example, is obtained whereas in measuring the cloud height in the absence of a precipitation a function F1 (H) according to FIG. 5A, for example, results. It has been found that risings or peaks of the function F1 (H) are conditioned both by clouds and by precipitation whereby the magnitude of the peak values (maxima) of the rising parts of the function does not provide any information whether the corresponding rising is caused by cloud or by precipitation. According to the invention it has been recognized that a rising of the function caused by a cloud differs from the rising caused by a precipitation by a steeper rising flank and also by a steeper falling flank. Physically, this phenomenon can be explained perhaps due to the fact that density of water drops in a cloud is greater than the density of falling drops during a precipitation. Starting from this basic recognition, the principle of the evaluation according to this invention resides in smoothening the function F1 (H), then differentiating the smooth function and determining maxima and minima of the differentiated function. A consecutive maximum/minimum pair is an indication of a cloud provided that the maximum and the minimum differs from a certain constant threshold value C1, C2 determined experimentally. In order to safeguard that the maximum-minimum pair did not originate from an accidental integration of higher noise signals an additional test is made whether the original function F1 (H) obtained through measurement sufficiently projects above the noise level at the height of the maximum/minimum pair.

Figure 3:
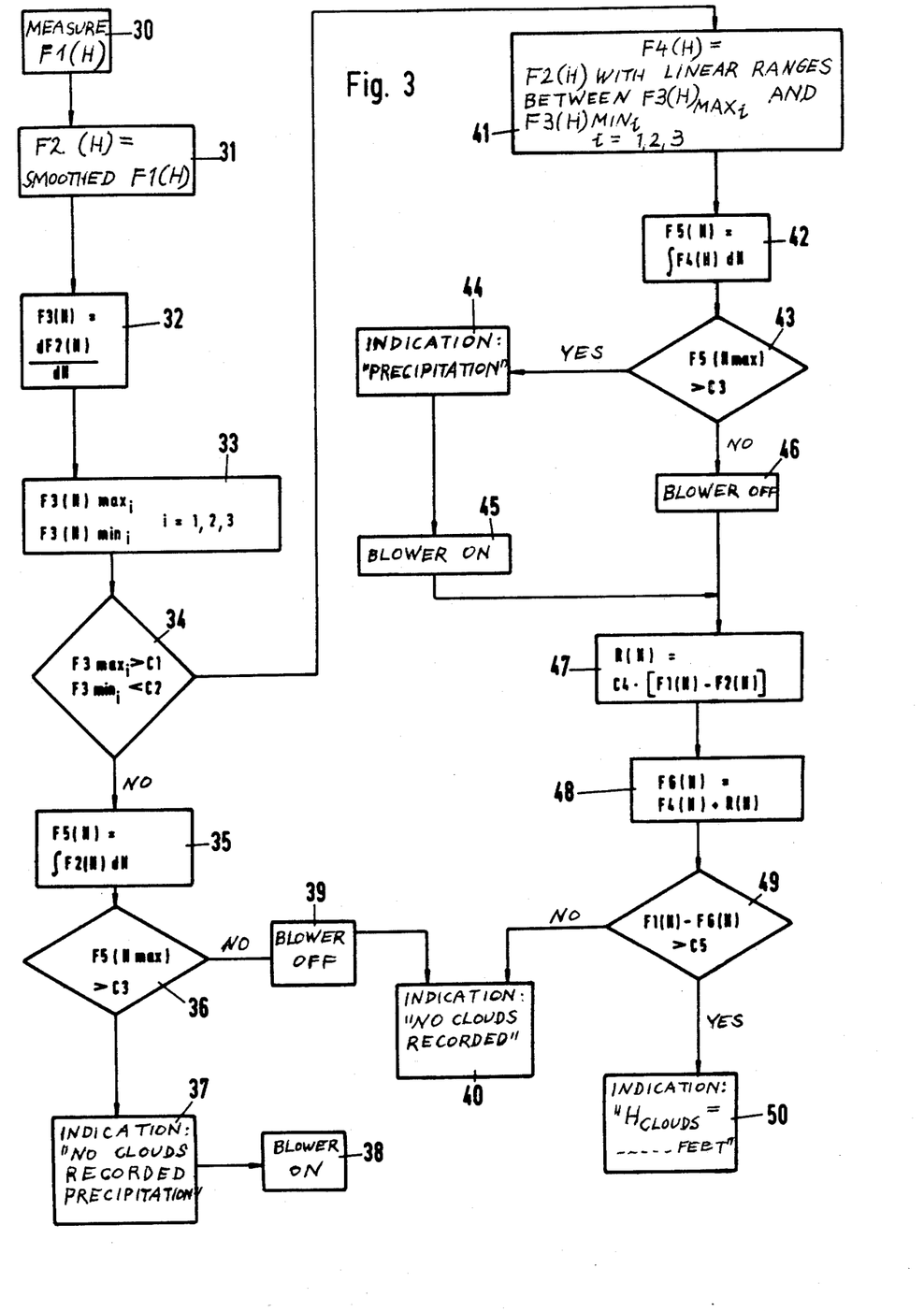
FIG. 3 is a simplified flow chart of the program of evaluation means (microprocessor) of FIG. 2.
Figure 4A:
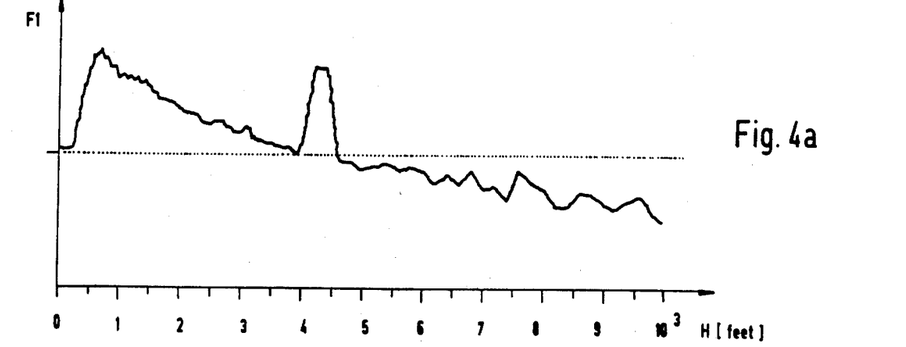
FIGS. 4A through 4E show plot diagrams of functions F1, F2, F3, F5, and F6 in the case when a cloud during precipitation is detected.
Figure 4B:
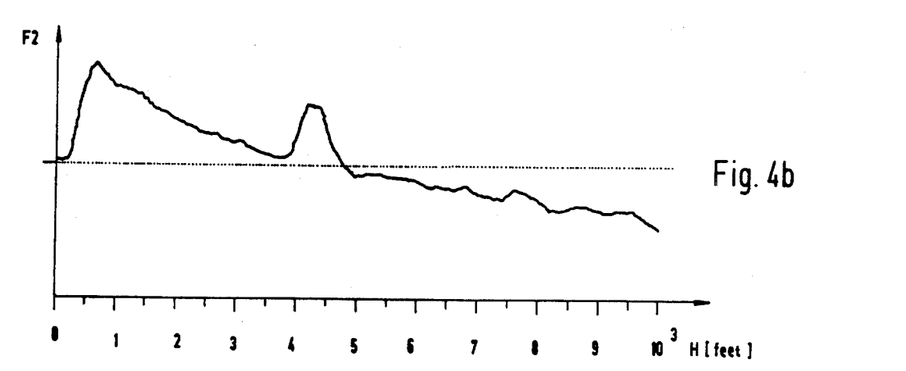
Figure 4C:
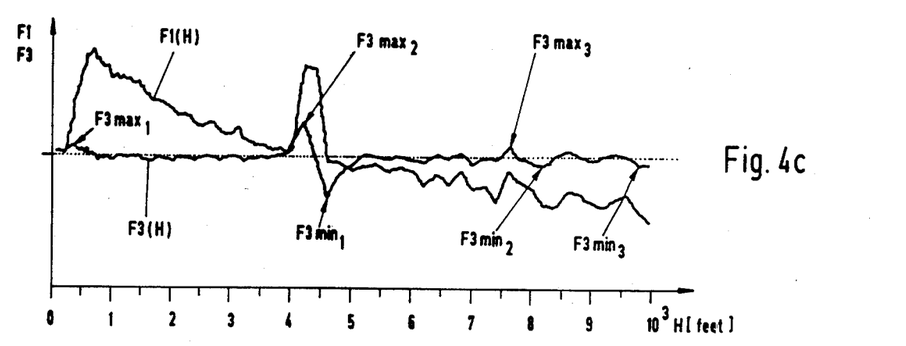

According to the flow chart of FIG. 3, the operational program of the evaluation device or microprocessor 14 starts in program stage 30 with the input of integrated signal values stored in data memory 13 in the order of height values H of which a function F1 (H) is formed as illustrated, for example, in FIG. 4A. In a second program stage 31, the function F1 (H) is smoothed. The resulting smooth function F2 (H) is illustrated in FIG. 4B. In the next programming stage 32, the smooth function F2 (H) is differentiated with respect to height value H, whereby a differentiated function F3 (H) illustrated in FIG. 4C is obtained. In the subsequent programming stage 33 the three largest maxima that means the peak points of the three largest positive amplitudes $F3MAX_i$ and the three minima, that means the three largest values of negative amplitudes $F3MIN_i$ of the the differentiated function F3 (H) are determined. In practice, the determination of more than three layers of clouds is of no interest. Thereafter, in a logic evaluation stage 34 it is tested whether the three maxima $F3MAX_i$ are larger than an experimentally found constant threshold value C1 and whether the three minima $F3MIN_i$ are smaller than an experimental minimum threshold value C2. Maxima $F3MAX_i$ which exceed the threshold valve C1 and minima $F3MIN_i$ that fall below the threshold value C2 are further tested in the logic decision stage 34 whether the corresponding height values assigned thereto follow in the sequence maximum/minimum/maximum and so on one after the other. In doing so, it is first tested whether a differentiated value associated with the smallest height value is a maximum or a minimum. If it is a minimum then it is erased. If it is a maximum then it is tested whether the differentiated value pertaining to the subsequent height value is a maximum or a minimum. If the differentiated value is again a maximum then the first-mentioned maximum is erased. If the differentiated value assigned to the next larger height is a minimum then the height range corresponding the maximum/minimum pair $F3MAX_i/F3MIN_i$ is stored in the memory. If minimum is followed by another minimum then the latter is erased. If it is followed by a maximum then it is tested whether the latter maximum is again followed by a minimum; if so then the height range corresponding to the second maximum/minimum pair F3MAX/F3MIN is also stored in the memory. As a result of these procedures the decision stage 34 determines whether one or more maximum/minimum pairs F3MAX/F3MIN following each other according to height values are present and whether they are larger than predetermined threshold values C1 and C2 and if such pairs are determined the associated height ranges are stored in the memory.

The program decision stage 34 will be explained in connection with the example of FIG. 4C. In the exemplary plot diagram it is assumed that three maxima $F3MAX_1$, $F3MAX_2$, $F3MAX_3$ are larger than a threshold value C1, and the three minima $F3MIN_1$, $F3MIN_2$ and $F3MIN_3$ are smaller than a treshold value C2 whereby the threshold values C1, C2 in this example are very small as indicated by dotted lines. In practice, the threshold values C1, C2 are set larger so that only values $F3MAX_2$ and $F3MIN_1$ indicative of effective cloud height, differ from these values. In testing the sequence of six maxima and minima the following will result: Although the first value $F3MAX_1$ is a maximum, it is erased because the subsequent $F3MAX_2$ is again a maximum. The maximum $F3MAX_2$ is followed by a value $F3MIN_1$, that is by a minimum. Consequently, the height range pertaining to the pair $F3MAX_2/F3MIN_1$ is stored. This pair is followed by a further maximum/minimum pair $F3MAX_3/F3MIN_2$ whose height range is also stored. The minimum $F3MIN_2$ is followed by a minimum $F3MIN_3$ which becomes erased.

If in the decision stage 34 no maximum/minimum pair is determined, it means that no clouds are recorded. In the latter case, the decision "No" of the stage 34 is followed by a program stage 35 in which the smooth function F2 (H) is integrated over the height values and in the subsequent decision stage 36 it is tested whether the resulting integral F5 is larger than an experimentally found threshold valve C3. If it is larger, it means that in the absence of a cloud strong backward scattering of transmitted light pulses 3 toward the light receiver 6 has occured and consequently the precipitation is present. In this case the microprocessor 14 delivers via the I/O unit 26 a command to the subsequent programming stage 37 to display in the indicating device 27 the message "No Clouds Record—Precipitation" and at the same time outputs a command to stage 38 for turning on the air blower 23. If the stage 36 decides "No", that means if F5 is smaller than C 3 and consequently if no precipitation is detected, a turn off signal in programming stage 39 is applied to the aim blower 23 and the indicator 27 receives in programming stage 40 a command to display message "No Clouds Recorded".

When the decision stage 34 determines one or more maximum/minimum pairs F3MAX/F3MIN as shown in FIG. 4C, it is to be concluded that at the height pertaining to each of the maxima a cloud is present. In the subsequent programming stages 41 through 49 it is tested whether a precipitation takes place and whether signal values of the function F1 (H) pertaining to the hight values associated with the maxima exceed sufficiently the noise level, thus confirming the presence of a cloud.

In programming stage 41 a function F4 (H) is formed which conforms to the smooth function F2 (H) but in which the functional intervals or curve sections of the function F2 (H) preventing to the height ranges associated with the maximum/minimum pairs F3MAX/F3MIN, are substituted by a linear function or a linear section, respectively. The function or curve F4 (H) thus differs from the curve F2 (H) in that the raised curve parts of F2 (H) which pertain to height ranges defined by F3MAX/F3MIN pairs are erased and the resulting gaps are bridged by a straight line.

Figure 4D:
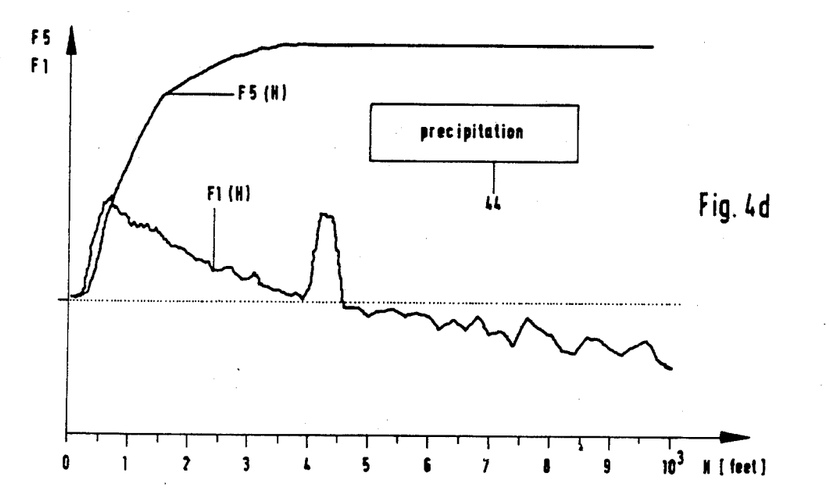

In order to determine a precipitation, in the next programming stage 42 the function F4 (H) is integrated over the entire height measuring range and in the following program decision stage 43 the integral value at the maximum height of the measuring range F5 (HMAX) is compared with an experimentally found constant threshold value C3. Since the risings of the function curve F2 (H) caused by clouds are substituted in the function F4 (H) by a linear function part, the integral F5 (H) is dependent only on the reflection or back scattering of light pulses 3 resulting from the precipitation. If the integral F5 (H) is larger than the threshold value C3 then in the stage 44 a display command "Precipitation" and in the stage 45 a command for turning on the air blower 23, are delivered; if the integral is smaller than C3 a turn off command for the blower is issued in stage A6. From the example in FIG. 4D it will be seen that the integral F5 (H) is very large and hence the threshold value C3 is exceeded and consequently a precipitation message is displayed. In comparison with the original measuring function F1 (H) also plotted in FIG. 4D, it will be seen that the magnitude of the integral F5 (H) is dependent on the first rising of the function F1 (H) or F2 (H) whose slower falling slope in the differentiated function F3 (H) of FIG. 4C has no minimum so that the rising in the function F4 (H) is not substituted by a rectilinear curve part.

Thereafter a noise function R (H) is formed. For this purpose, as indicated in program stage 47, the absolute value of the difference between the functions F1 (H) and F2 (H) for each height value is formed and multiplied by a constant integer C4, for example by 3. Thereupon in program stage 48 the sum F6 (H) of the functions F4 (H) and noise function R (H) is formed. In the following decision stage 49 it is tested whether the difference between the functions F1 (H) and F6 (H) in height ranges defined by F3MAX/F3MIN pairs is greater than a predetermined constant threshold value C5. If not, in stage 40 a command for a display message "No Clouds Recorded" is issued inasmuch as in this case the F3MAX/F3MIN pairs determined in programming stage 33 are produced by risings which do not sufficiently protrude above noise level. If the threshold value C5 is exceeded, a command is issued in stage 50 for displaying the cloud height or heights. Displayed are heights H pertaining to maxima of those F3MAX/F3MIN pairs in whose height ranges the difference between the functions F1 (H) and F6 (H) is greater than the threshold value C5. A zero can be selected as the selected threshold value C5 if the constant factor C4 is sufficiently large.

Figure 4E:
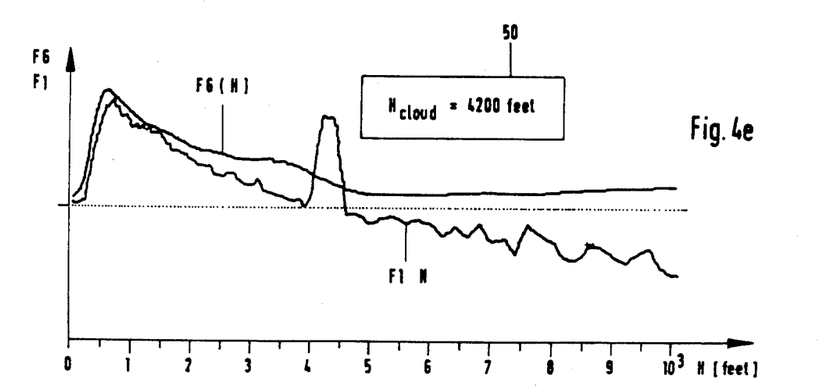

In the example according to FIG. 4E it will be recognized that the difference between the values of functions F1 (H) and F6 (H) can be larger than the threshold value C5 only in the height ranges of the first maximum/minimum pairs $F3MAX_2F3MIN_1$ of FIG. 4C. In the height range between the second maximum/minimum pair $F3MAX_3/F3MIN_2$ the original function F1 (H) is smaller than F6 (H) and consequently the second pair is not derived from a cloud but from noise. Accordingly, as true cloud height is indicated the value H=4,200 feet at which the maximum $F3MAX_2$ occurs.

Figure 5A:
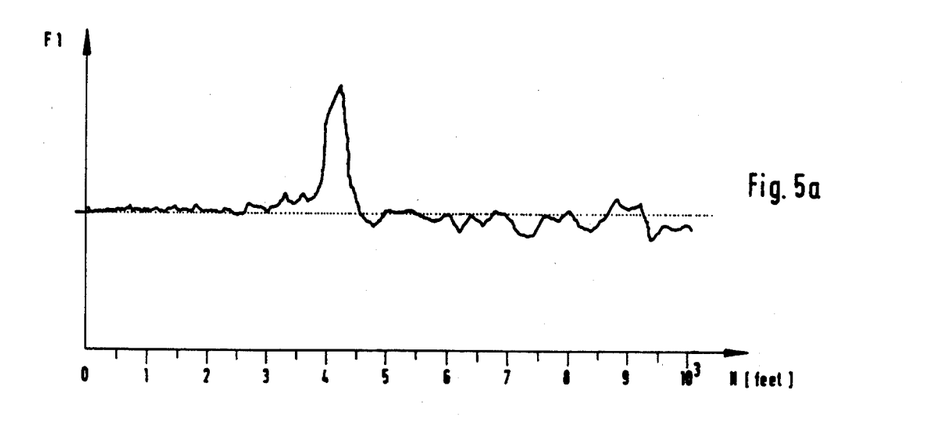
FIGS. 5A and 5B illustrate plot diagrams of functions F1, F2 and F3 in the case of detecting a cloud in the absence of a precipitation.
Figure 5B:
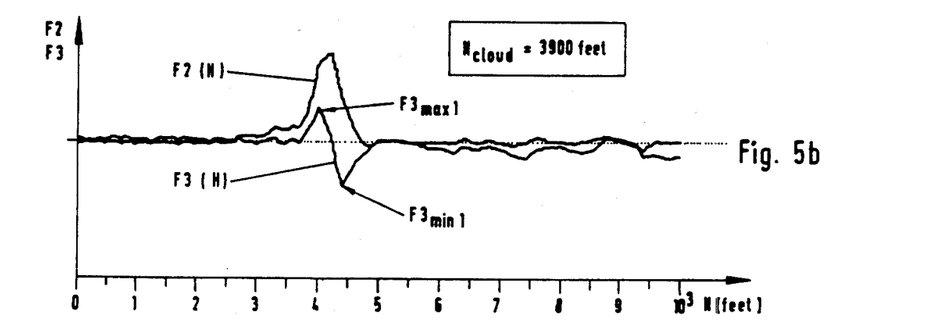

FIGS. 5A and 5B illustrate plot diagrams of functions F1 (H), F2 (H) and F3 (H) resulting when a cloud is at the height H=3,900 feet and no precipitation is present. It will be seen that in the decision program stage 34 a single maximum/minimum pair $F3MAX_1/F3MIN_1$ is determined; in the decisin stage 43 it is determined that the integral value F5 (HMAX) is smaller than C3; and in decision stage 49 it is determined that the values of functions F1 (H) in the height range of the maximum/minimum pair $F3MAX_1/F3MIN_1$ is substantially larger (by about C5) than the values of the function F6 (H) and consequently the cloud height is indicated at the location of $F3MAX_1$.

Of course, the operational program for the microprocessor 14 forming the evaluation means in the device of this invention can be also designed in a different manner than indicated in FIG. 3. In a simplest case, only the program stages 30 through 34 are involved and in contrast to the program of FIG. 3 which enables also the detection of height of several weakly reflecting clouds, in the simplified program only the detection of a strongly reflecting cloud is possible. In doing so, only the cloud height defined by the height value of the largest maximum F3MAX of the differentiated function is indicated provided that the maximum F3MAX exceeds the threshold value C1 and the subsequent minimum F3MIN falls below the threshold value C2. Also in this modified program the determined cloud height is tested in a simple manner in a further decision stage where for example the intgrated signal value F1 ($H_{cloud}$) pertaining to the determined cloud height (height of F3MAX) has exceeded a constant predetermined noise level. Of course, there are possible numerous other modifications of the operative program of FIG. 3, for example subprograms designed for special atmospheric conditions such as mist and the like, can be included.

In order to avoid the destruction of the laser diode array 1 arranged in the focus of transmitter optic 28 by heat resulting at strong shunshine, a non-illustrated cover disc or shutter can be provided in combination with an auxiliary photodetector for measuring solar radiation. The light reflecting cover disc or shutter being controlled by an electromagnetic device to automatically move in the path of rays between the array 1 and the transmitter optics 28 when the output signal from the auxiliary photodetector exceeds a predetermined safety level. In the latter case, the transmitter control unit is disconnected. A corresponding reflecting cover plate or shutter can be also provided at the side of the receiver 6.

While the invention has been illustrated and described as embodied in a specific example of a ceilometer, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ceilometer comprising a transmitter for transmitting light pulses, a receiver including a photodetector for receiving light pulses reflected from clouds an generating corresponding output signals, gating means for passing-through the output signals from the receiver during time slots following each other at a transmitter frequency with a predetermined phase shift relative to the transmitted light pulses, an integrator connected to the gating means to integrate the passed output signals over a time interval covering a plurality of time slots of the same phase shift, a memory for storing the integrated signal values in the order of consecutive height values determined by the phase shift of the time slots, evaluation means including means for forming from the stored integrated values a smooth function with respect to a range of consecutive height values, differentiating means for differentiating the smooth function with respect to the height values, means for determining from the differentiated smooth function those maxima (F3max) which exceed a predetermined first threshold value and those minima which fall below a predetermined second threshold value and detecting maximum/minimum pairs wherein a minimum immediately follows a maximum, and indicating means for displaying as cloud heights the values pertaining to maxima in the maximum/minimum pairs.

2. A ceilometer as defined in claim 1, wherein said evaluating means is a microprocessor including an interface, an input/output unit, and being coupled to said memory.

3. A ceilometer as defined in claim 1, wherein said evaluation means integrates the smooth function (F2) over the height measuring range and delivers a command for displaying in said indicating means a precipitation indicating message provided that the integral is greater than a predetermined threshold value.

4. A ceilometer as defined in claim 3, wherein said transmitter and said receiver includes respectively optical devices having surfaces through which the transmitted or received light pulses pass; a blower for blowing air on said optical surfaces; and means for turning on said blower in response to a command issued by said evaluating means in the event that the precipitation indicating message is present.

5. A ceilometer as defined in claim 4, comprising an auxiliary photodetector for detecting reflections from said transmitter optical device caused by soiling of its optical surface, said auxiliary photodetector being coupled to said evaluating means and the latter being programmed so as to issue in the event that the signal from the auxiliary photodetector exceeds a predetermined threshold value, a command for displaying on said indicating means the soiled condition of said optical surfaces.

6. A ceilometer as defined in claim 5, wherein said evaluating means is programmed for blocking said message about the soiling condition of said optical surfaces provided that a command for indicating the precipitation is issued.

7. A ceilometer as defined in claim 4, further comprising means for heating said optical surfaces, and a temperature sensor coupled via said evaluating means to said heating means to activate the same when a freezing temperature is detected.

8. A ceilometer comprising a transmitter for transmitting light pulses, a receiver including a photodetector for receiving light pulses reflected from clouds and generating corresponding output signals, gating means for passing-through the output signals from the receiver during time slots following each other at a transmitter frequency with a predetermined phase shift relative to the transmitted light pulses, an integrator connected to the gating means to integrate the passed output signals over a time interval covering a plurality of time slots of the same phase shift, a memory for storing the integrated signal values (F1) in the order of consecutive height values determined by the phase shift of the time slots, evaluation means including means for forming from the stored integrated values a smooth function (F2) with respect to a range of consecutive height values, means for differentiating the smooth function (F2) with respect to the height values, means for determining from the differentiated smooth function (F3) those maxima (F3max) which exceed a predetermined first threshold value (C1) and those minima (F3min) which fall below a predetermined second threshold value (C2) and detecting maximum/minimum pairs (F3max/F3min) wherein a minimum (F3min) immediately follows a maximum (F3max), comparing means for comparing the integrated signal values (F1) with a predetermined third threshold value (C5) and for determining each of those height values which pertains both, to one of the maxima (F3max) in the maximum/minimum pairs (F3max/F3min) and to one of the integrated signal values (F1) exceeding said predetermined third threshold value (C5).

9. A ceilometer comprising a transmitter for transmitting light pulses, a receiver including a photodetector for receiving light pulses reflected from clouds and generating corresponding output signals, gating means for passing-through the output signals from the receiver during time slots following each other at a transmitter frequency with a predetermined phase shift relative to the transmitted light pulses, an integrator connected to the gating means to integrate the passed output signals over a time interval covering a plurality of time slots of the same phase shift, a memory for storing the integrated signal values (F1) in the order of consecutive height values determined by the phase shift of the time slots, evaluation means including means for forming from the stored integrated values a smooth function (F2) with respect to a range of consecutive height values, differentiating means for differentiating the smooth function (F2) with respect to the height values, means for determining from the differentiated smooth function F3) those maxima (F3max) which exceed a predetermined first threshold value (C1) and those minima (F3min) which fall below a predetermined second threshold value (C2) and detecting maximun/minimum pairs (F3max/F3min) wherein a minimum (F3min) immediately follws a maximum (F3max), means for determining the height ranges lying between the height value pertaining to the maximum (F3max) and the height value pertaining to the minimum (F3min) of each maximum/minimum pair (F3max/F3min) and for modifying the smooth function (F2) by substituting function intervals which lie in the determined height ranges with linear function intervals, means for forming an added function (F6=F4+R) by adding to the modified smooth function (F4) with linear function parts a predetermined noise function (R), comparing means for comparing the integrated signal values (F1) with the values of the added function (F6=F4+R) related to corresponding height values and for determining each of those height values which pertains both, to one of the maxima (F3max) in the maximum/minimum pairs (F3max/F3min) and to one of the integrated signal values (F1) exceeding the value of the added function (F6=F4+R), and indicating means for displaying as cloud heights the height values pertaining both to maxima (F3max) in the maximum/minimum pairs (F3max/F3min) and to integrated signal values (F1) exceeding the value of the added function (F6=F4+R).

10. A ceilometer as defined in claim 9, wherein said noise function is dependent on height.

11. A ceilometer as defined in claim 9, wherein said evaluation means integrates the modified smooth function (F4) with linear function parts over the height measuring range and delivers a command for displaying in said indicating means a precipitation indicating message provided that the integral is greater than a predetermined threshold value.

* * * * *